United States Patent
Kreft

(10) Patent No.: US 6,240,368 B1
(45) Date of Patent: May 29, 2001

(54) POSITIONING SYSTEM FOR A MOTOR VEHICLE HAVING A SATELLITE RECEIVER

(75) Inventor: Peter Kreft, Hannover (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/297,547

(22) PCT Filed: Sep. 4, 1997

(86) PCT No.: PCT/DE97/01945

§ 371 Date: Jul. 12, 1999

§ 102(e) Date: Jul. 12, 1999

(87) PCT Pub. No.: WO98/20359

PCT Pub. Date: May 14, 1998

(30) Foreign Application Priority Data

Nov. 2, 1996 (DE) ................................. 196 45 209

(51) Int. Cl.$^7$ ................. G01S 5/14; G01S 3/52; G01C 21/20
(52) U.S. Cl. ............... 701/214; 701/210; 342/357.06
(58) Field of Search ................... 701/208, 213, 701/214, 209, 210, 216, 220; 342/357.06, 357.08, 357.13, 357.14

(56) References Cited

U.S. PATENT DOCUMENTS

| | | |
|---|---|---|
| 4,796,191 * 1/1989 | Honey et al. | 701/217 |
| 4,807,127 2/1989 | Tenmoku et al. | |
| 4,890,233 12/1989 | Ando et al. | |
| 5,311,195 * 5/1994 | Mathis et al. | 342/357 |
| 5,436,840 * 7/1995 | Lam et al. | 701/208 |
| 5,488,559 * 1/1996 | Seymour | 701/208 |
| 5,508,931 * 4/1996 | Snider | 701/207 |
| 5,740,049 * 4/1998 | Kaise | 701/217 |
| 5,852,791 * 12/1998 | Sato et al. | 701/217 |
| 6,002,981 * 12/1999 | Kreft | 701/210 |

FOREIGN PATENT DOCUMENTS

| | | |
|---|---|---|
| 0 496 538 | 7/1992 | (EP) . |
| 0 580 167 | 1/1994 | (EP) . |
| 0 699 894 | 3/1996 | (EP) . |
| 0 716 289 | 6/1996 | (EP) . |
| 8-145706 * | 6/1996 | (JP) . |
| 95/30881 * | 11/1995 | (WO) . |

* cited by examiner

*Primary Examiner*—Michael J. Zanelli
(74) *Attorney, Agent, or Firm*—Kenyon & Kenyon

(57) ABSTRACT

In a positioning system for a motor vehicle having a satellite receiver, a direction vector subject to error is determined from the received satellite signals. The direction vector subject to error forms an angular range of the direction of travel including a main path and optionally secondary paths of a digitized road map. To determine the actual direction of travel of the motor vehicle, the main path and optionally the secondary paths are pursued, and the path having the best match with the direction vector of the angular range of direction is prioritized. The direction vector is determined from the change in frequency of the received satellite frequencies by the Doppler method.

8 Claims, 1 Drawing Sheet ndau # POSITIONING SYSTEM FOR A MOTOR VEHICLE HAVING A SATELLITE RECEIVER

BACKGROUND INFORMATION

The present invention relates to a positioning system for a motor vehicle having a satellite receiver. It is already known from European Published Patent Application No. 496 538 A2 that not only the position of a vehicle but also its direction of travel can be calculated with the help of the satellite receiver. The direction of travel is determined by calculating the difference between two position determinations. This method functions satisfactorily only when the GPS positions are measured over great distances, because each individual position is subject to considerable error (in civilian use: approximately 100 m).

Therefore, it is impossible to determine the direction of travel in real time with this method. Furthermore, this method assumes little or no coupling sensor error during the GPS measurement; however, that is only rarely the case in practice.

SUMMARY OF THE INVENTION

The present invention has the advantage that the determination of the direction of travel with the help of the satellite receiver is not affected by the positioning accuracy, and the direction of travel is determined almost in real time. It is especially advantageous that first an angular range of the direction of travel is assumed for the direction of travel of the vehicle; this range contains the direction of travel with a predetermined tolerance. The actual direction of travel and the location of the vehicle are advantageously determined with a high accuracy with the help of the angular range of the direction of travel and prioritization of a main path.

It is especially advantageous that the direction of travel of the motor vehicle is determined by the Doppler method from the received satellite frequencies (carrier wave) while the vehicle is traveling. With conventional GPS receivers, a velocity vector of the vehicle in the direction of travel can be determined with an accuracy of 0.1 m/s to 0.2 m/s with the help of the Doppler effect. However, the accuracy drops due to the artificial manipulation of the satellite signals by the GPS operator. The higher the vehicle velocity, the more accurately the velocity vector can be determined. To obtain the direction of the velocity vector with sufficient accuracy, the vehicle velocity must be considerably above this absolute value, because at a higher velocity, the manipulations of the carrier frequency (selective availability) performed by the GPS operator (U.S. Department of Defense) can also be disregarded. Experiments have shown that a GPS receiver yields usable results starting from speeds as low as approx. 15 km/h.

Since the determination of direction with the help of the GPS receiver can be regarded as an absolute measurement of the direction of travel, a direction sensor such as a rotational rate sensor or a gyro sensor may be calibrated to advantage. If there is an interruption in reception, the calibrated direction sensor can then advantageously detect the absolute direction of travel of the motor vehicle.

It is also advantageous that the computer of the positioning system determines a main path and optionally secondary paths with the help of the angular range of direction for the position determination. Weighting the main path and the secondary paths yields a new main path whose direction at the location of the presumed position best agrees with that of the angular range of direction. Due to the weighting of the individual paths, the determination of the direction of travel and the vehicle position is very reliable, because the vehicle can travel on only one of the paths (roads) detected.

It is also advantageous that with unclear determinations, in particular with a narrow network of roads with parallel paths, the previous main path is retained. This avoids making the driver of the motor vehicle uncertain about the actual direction of travel due to repeated changes between a main path and a secondary path.

DETAILED DESCRIPTION

Figure 1:
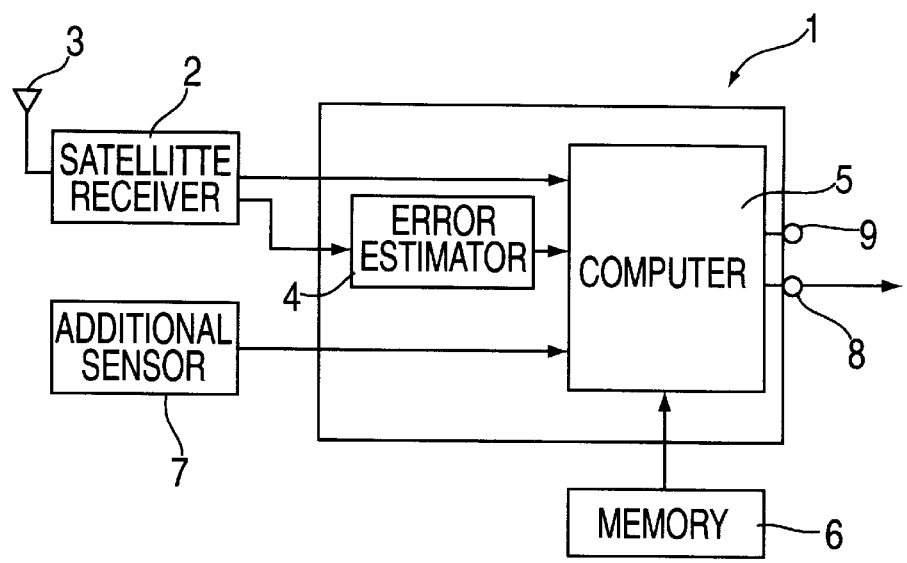
FIG. 1 shows a block diagram of a positioning system.

FIG. 1 shows a block diagram of a positioning system 1 which is known per se and therefore need not be described in greater detail. It has a computer 5 for calculating the directions of travel and the positions of the paths. In addition, a satellite receiver 2 is connected to the positioning system, receives satellite signals over an antenna 3 and analyzes them. One output of satellite receiver 2 is connected to an error estimator 4 with which an angular range can be determined for the direction of travel. Satellite receiver 2 is preferably a GPS receiver for receiving GPS satellite signals and/or a corresponding receiver for GLONASS satellites. The output of error estimator 4 is connected to computer 5. Additional sensors for determining the vehicle position, the path of travel and/or the direction of travel can be connected to positioning system 1. For example, a sensor, preferably a gyro sensor or an electronic compass may be provided as additional sensors 7 for determining the direction of travel. In addition, a memory 6 for a digital road map can be connected to computer 5. A quantity for the instantaneous direction of travel of the motor vehicle can be picked off at an output 8 of positioning system 1, and the most probable position of the vehicle (main path) can be picked off at output 9.

In the embodiment in FIG. 1, it is assumed that satellite receiver 2 is a GPS (global positioning system) receiver. The instantaneous vehicle position is calculated from the satellite signals of the GPS system received by antenna 3. GPS receiver 2 also determines the instantaneous vehicle velocity from the frequency shift by the Doppler method. Since GPS receiver 2 receives carrier frequencies from a plurality of satellites, a velocity vector is obtained for each satellite. By projecting the velocity vectors onto the plane of travel, a direction vector for the instantaneous direction of travel of the vehicle is obtained, although it is subject to a system error. As a measure of the accuracy of the measured direction of travel of the vehicle, in addition to the absolute velocity value, it is also possible to take into account the GDOP value (geometric dilution of precision), which takes into account the time error and the satellite geometry.

Because of the above-mentioned system error of GPS satellites, error estimator 4 calculates a vector in the direction of travel of the vehicle for the possible direction of travel which is subject to a tolerance. Due to this direction of travel which is subject to a tolerance, hereinafter called angular range 20 of the direction of travel, the actual direction of travel of the vehicle cannot be determined accurately. It will now be explained with reference to FIGS.

2 and 3 how the actual direction of travel of the motor vehicle can nevertheless be deduced from these calculations and error estimates according to the present invention.

Figure 2:
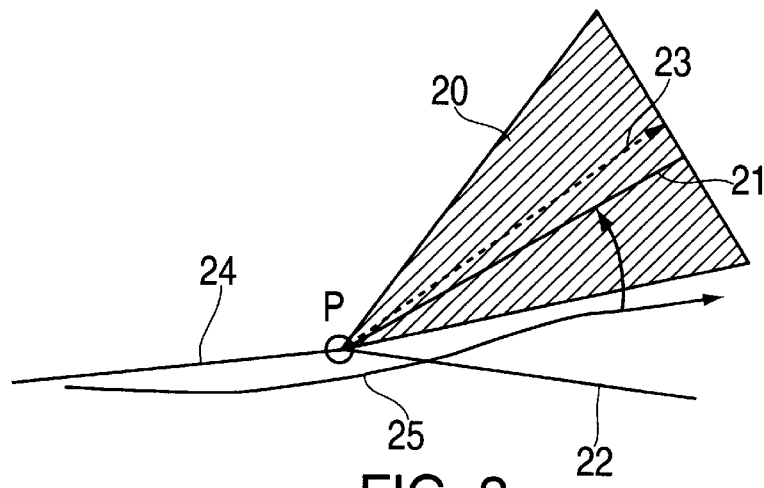
FIG. 2 shows a first diagram of an operation of a coupled positioning according to the present invention.

The prerequisite for positioning system 1 is that it must also have, in addition to GPS receiver 2, a memory 6 for a digital road map. Computer 5 then calculates a possible position of the vehicle by map matching, using the individual signals of GPS receiver 2, of additional sensors 7 and the digital road map of memory 6. FIG. 2 shows a detail of a digital road map with a road 24 and roads 21 and 22 branching off from it at point P. If the motor vehicle is first traveling on road 24, the position of the vehicle can also be sensed by additional sensors 7. These sensors also supply signals for the vehicle position subject to error, so FIG. 2 shows a curve 25 for the sensed positions running beside road 24, 21, 22. It is now assumed that the vehicle is turning off into road 21 beyond point P. Additional sensors 7 for the determination of direction, e.g., a gyro sensor or a compass, would also discern a change in direction, but they would not recognize clearly that the vehicle is on road 21, as shown by curve 25. The sensed positioning curve 25 runs between roads 21 and 22. If this curve is displayed on a screen together with roads 24, 21, 22, it is impossible to recognize which road the driver is actually on. At any rate, the driver will see that he and his vehicle are not between roads 21, 22, but instead they are on one of the roads.

Then the velocity signal of GPS receiver 2 is analyzed according to the present invention. On the basis of the known tolerances, error estimator 4 calculates an angular range 20 (shaded in FIG. 2) for the direction of travel for the vehicle at point P, for example. On the basis of the velocity signal calculated by the Doppler method using the frequency shift, a direction vector 23 is obtained for the instantaneous direction of travel of the vehicle. Direction vector 23 (dotted line) is at the center within the angular range 20 of the direction of travel and runs almost parallel to road 21. Computer 5 then compares the individual road angles to determine that only road 21 is within angular range 20 of the direction of travel, while road 22 is outside angular range 20 of the direction of travel. Since direction vector 23 also runs approximately parallel to road 21, road 21 has the highest priority for the instantaneous position and direction of the vehicle, while road 22 as a secondary path has a lower priority. Computer 5 selects road 21 as the main path and indicates its direction as the direction of travel of the vehicle. This signal can be picked off at output 8 of positioning device 1 and can be output to a display, for example. Road 22 is not pursued further as a secondary path because it is outside the angular range of the direction. Computer 5 pursues main path 21 and possibly one or more secondary paths 22 and checks to determine whether a secondary path can be selected as the new main path. In an exceptional case, two parallel roads may be located so close side by side that both roads could be considered the main road. In this case, the previous main path is retained until a definite decision regarding the main path is possible. This prevents the driver of the vehicle from becoming uncertain due to jumping back and forth from one path to another (evaluation hysteresis).

Figure 3:
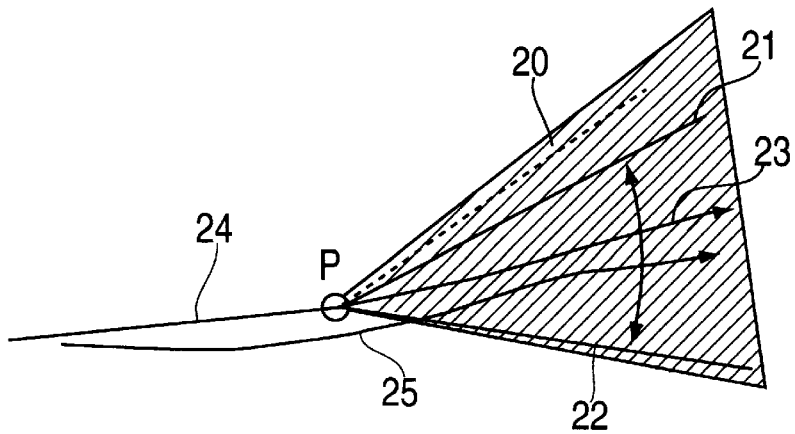
FIG. 3 shows a second diagram of an operation of a coupled positioning according to the present invention.

FIG. 3 shows the same road map detail with roads 24, 21, 22 as shown in FIG. 2. It is assumed here that angular range 20 of the direction of travel is laid out at point P to include both roads 21, 22. It is also assumed that direction vector 23 runs approximately between two roads 21, 22 according to the arrow shown with dotted lines. Direction of travel 25 determined by additional sensors 7, e.g., the gyro sensor, runs approximately parallel to direction vector 23 of angular range 20 of the direction of travel. Integrated direction 25 of a differential gyro sensor 7, for example, as well as direction vector 23 of angular range 20 of the direction of travel are thus located between the two directions of roads 21 and 22. However, the angular difference from the path of road 21 is smaller than that from the path of road 22. Road 21 is therefore selected as the new main path. Direction vector 23 of the main path or direction of travel 25 determined by gyro sensor 7 is adapted to the directional path of road 21. Thus, an absolute angle of travel of an integrating direction sensor 7 can be corrected with this method by adaptation to the path of the road in question, and direction sensor 7 can be calibrated.

However, since secondary path 22 is also plausible, the direction of travel for it is adapted to the direction of road 22, as long as it remains plausible. Thus, an independent calculation of the direction of travel is performed for the main path and all the secondary paths.

With the method described above, an angle sensor or a rotational rate sensor can be calibrated with the help of satellite navigation and initialized with regard to the absolute direction of travel so that an absolute direction of travel is obtained for the motor vehicle. Therefore, the GPS system in particular represents an advantageous addition to a positioning system with a differential angle sensor. It is especially advantageous that GPS measurements have a long-term stability, whereas a differential angle sensor has only a short-term stability. On the other hand, the differential angle sensor can be used with sufficient accuracy for the determination of the angle of travel if there is too little utilization of the Doppler effect due to a low vehicle speed, for example, or if the satellite reception is affected by interference.

In another embodiment of the present invention, an electronic compass is used instead of differential angle sensor 7. Since the electronic compass, e.g., a biaxial magnetometer, may select a false north direction due to magnetic interference, the calibration is also performed with the help of GPS satellites as described previously.

The different direction of travel data is analyzed with a Kalman filter, for example, or according to the principle of coupled locating. When using a differential direction sensor 7, the error integrated over time which increases continuously is determined with the help of the direction of travel calculated by the Doppler method. Again in this case, the angular range of direction is prioritized compared to the direction of travel determined by additional sensors 7.

What is claimed is:

1. A positioning system for a motor vehicle, comprising:
    a computer;
    a satellite receiver in communication with the computer and for receiving a signal from at least one of a GPS satellite and a GLONASS satellite, the satellite receiver calculating from the received signal a direction of travel of the motor vehicle subject to a tolerance represented by an angular range of the direction of travel for an assumed position of the motor vehicle;
    a path sensor in communication with the computer; and
    means for communication with the computer and for providing a digital road map, wherein:
        the computer determines an actual direction of travel at the assumed position of the motor vehicle,
        the computer determines, in a subregion of the digital road map containing a plurality of roads, a main path intended to include an instantaneous position of the motor vehicle,
        the computer determines as an alternative a plurality of secondary paths intended to include the instantaneous position of the motor vehicle, a direction of the main path is compared with the angular range, the angular range including a direction of travel of the satellite receiver, the angular range is prioritized so that only those of the main path and the plurality of secondary paths having respective directions occurring within the angular range receive further consideration by the computer, and the main path is retained if an unclear determination occurs due an occurrence of a plurality of parallel paths within a narrow network of roads.

2. The positioning system according to claim 1, wherein:

the satellite receiver receives a plurality of satellite signal frequencies while the motor vehicle is traveling, and the satellite receiver determines the direction of travel of the motor vehicle by performing a Doppler operation on the basis of a change in a frequency of the plurality of satellite signal frequencies.

3. The positioning system according to claim 1, wherein:

the path sensor includes one of a direction sensor and a rotational rate sensor, a direction finding is provided by the path sensor, the satellite receiver provides an instantaneous direction vector corresponding to a directional value, and the direction finding is related to the directional value by being one of superimposed on the directional value and corrected by the directional value.

4. The positioning system according to claim 3, wherein the direction sensor includes a gyro sensor.

5. The positioning system according to claim 1, wherein a size of the angular range is determined by a system error of at least one of the satellite receiver and the positioning system.

6. The positioning system according to claim 1, wherein the computer determines a direction vector for each one of the main path and the plurality of secondary paths at a location of the assumed position of the motor vehicle.

7. The positioning system according to claim 1, wherein the computer:

weights the main path and the plurality of secondary paths, and determines as a new main path a path having a direction that most closely matches that of the angular range at a location of the assumed position of the motor vehicle.

8. The positioning system according to claim 1, wherein the computer:

compares the direction of travel at a location of the assumed position of the motor vehicle with a path of each road in the subregion of the digital road map, and determines a new main path as the path having the closest match with respect to the direction of travel.

* * * * *